United States Patent [19]

Sigler

[11] Patent Number: 5,731,907

[45] Date of Patent: Mar. 24, 1998

[54] AUXILIARY LENS WITH LIQUID ELEMENT FOR CORRECTING SECONDARY COLOR

[75] Inventor: Robert D. Sigler, Cupertino, Calif.

[73] Assignee: Lockheed Missiles & Space Company, Inc., Sunnyvale, Calif.

[21] Appl. No.: 741,227

[22] Filed: Oct. 29, 1996

Related U.S. Application Data

[63] Continuation of Ser. No. 342,128, Nov. 18, 1994, abandoned.

[51] Int. Cl.⁶ .................... G02B 1/06; G02B 9/00
[52] U.S. Cl. .................... 359/665; 359/797
[58] Field of Search .................... 359/665, 819, 359/796, 797

[56] References Cited

U.S. PATENT DOCUMENTS

| | | | |
|---|---|---|---|
| 3,901,585 | 8/1975 | Bennett et al. | 350/184 |
| 4,932,762 | 6/1990 | Robb | 350/418 |
| 4,958,919 | 9/1990 | Sigler | 350/418 |
| 5,033,831 | 7/1991 | Sigler | 350/418 |
| 5,345,337 | 9/1994 | Sigler | 359/665 |
| 5,446,591 | 8/1995 | Medlock | 359/665 |
| 5,459,614 | 10/1995 | Leary | 359/665 |

OTHER PUBLICATIONS

"Gleanings for ATM's—A New Approach to Color Correction" by Roger W. Sinnott, from Sky & Telescope, dated Oct. 1985, pp. 375–378.

"Glass selection for airspaced apochromats using the Buchdahl dispersion equation" by Robert D. Sigler, from Applied Optics, vol. 25, No. 23, dated Dec. 1, 1986, pp. 4311–4320.

"Apochromatic color correction using liquid lenses" by Robert D. Sigler, from Applied Optics, vol. 29, No. 16, dated Jun. 1, 1990, pp. 2451–2459.

"Liquid lenses yield better vision" by Mark A. Gottschalk, from Design News, dated Apr. 25, 1994, pp. 54 and 58.

*Primary Examiner*—David C. Nelms
*Assistant Examiner*—Jordan M. Schwartz
*Attorney, Agent, or Firm*—Fenwick & West LLP

[57] ABSTRACT

A color corrector having a liquid lens with abnormal dispersion characteristics is coupled axially to an achromatic optical system to reduce its residual color errors. The color corrector is positioned along the axis between the entrance pupil of the achromatic lens system and the image plane.

4 Claims, 4 Drawing Sheets

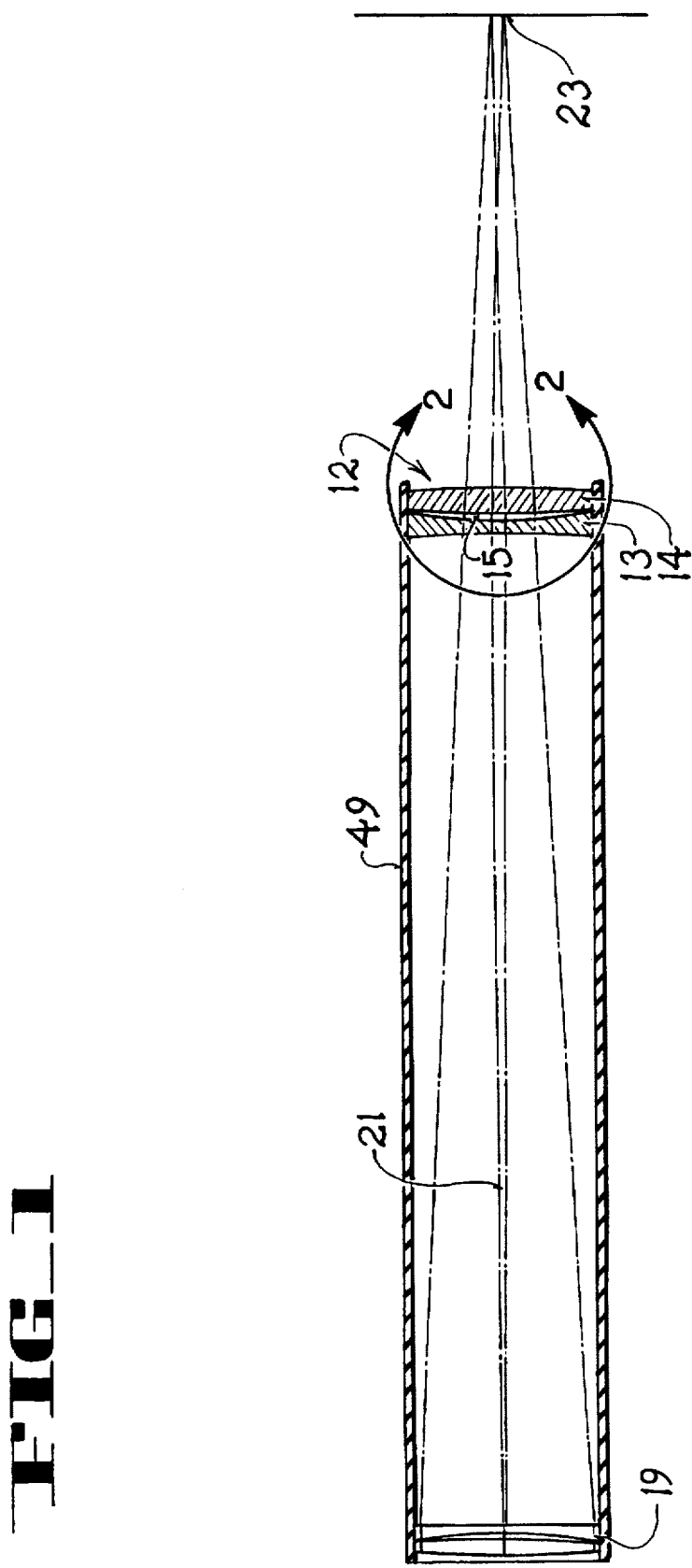
FIG_1

FIG_2
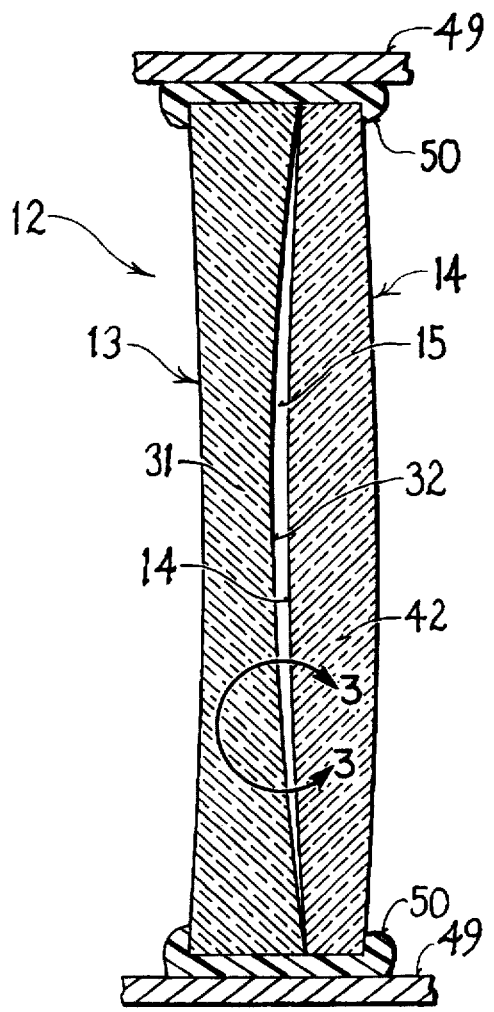
FIG_3
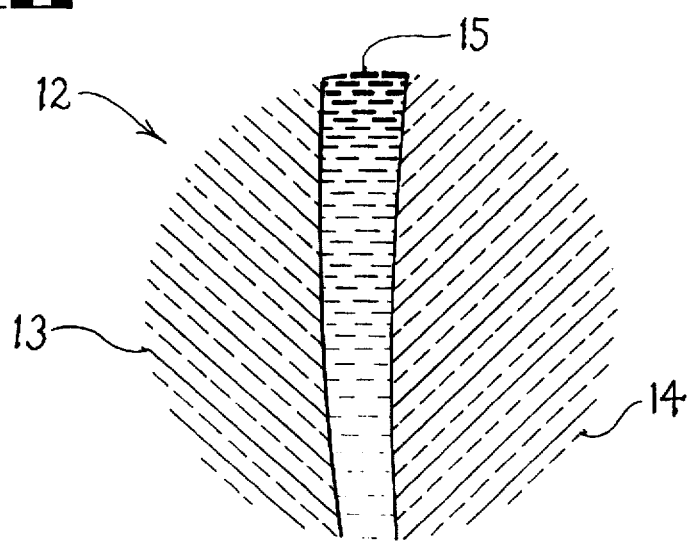

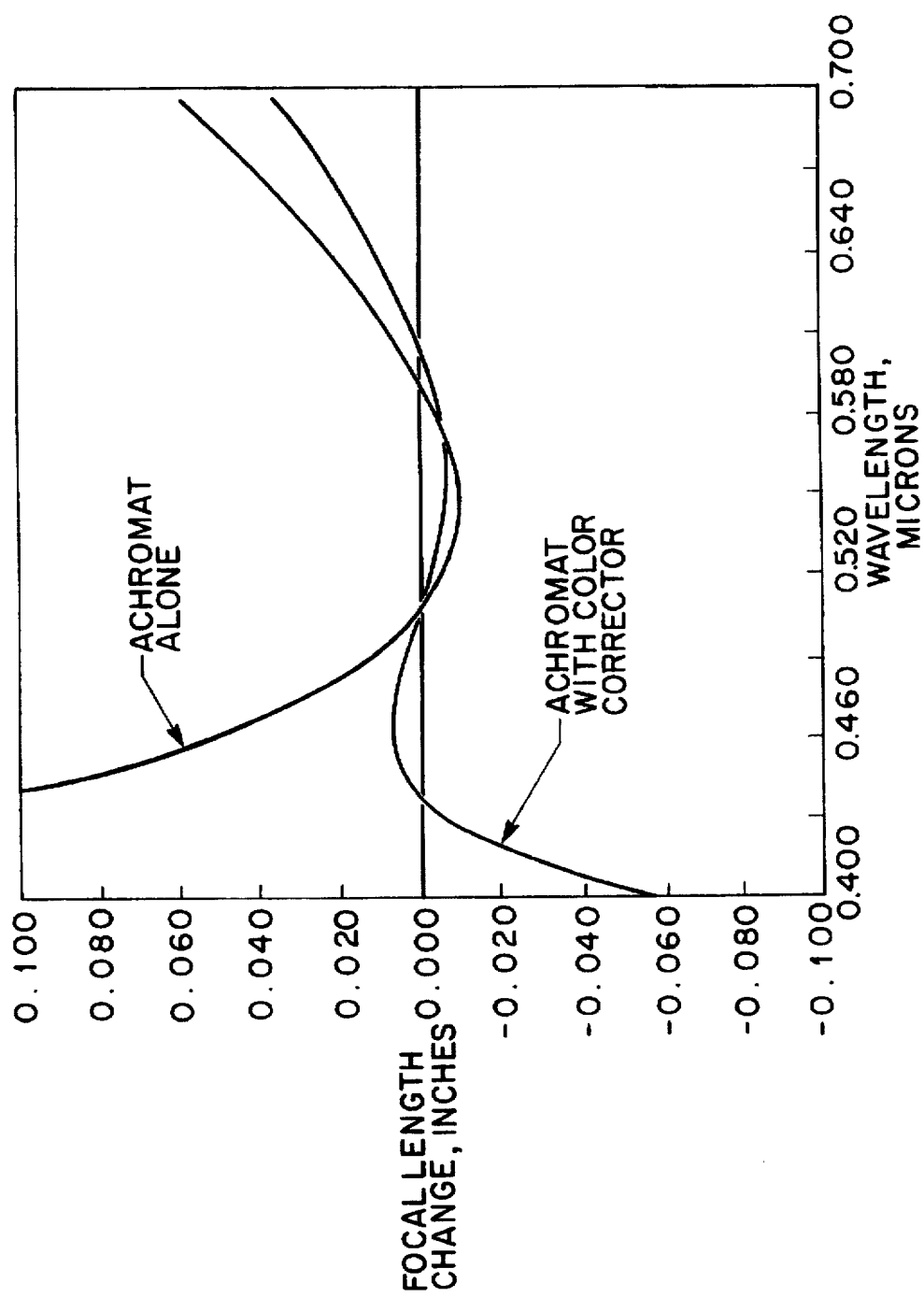
FIG_4

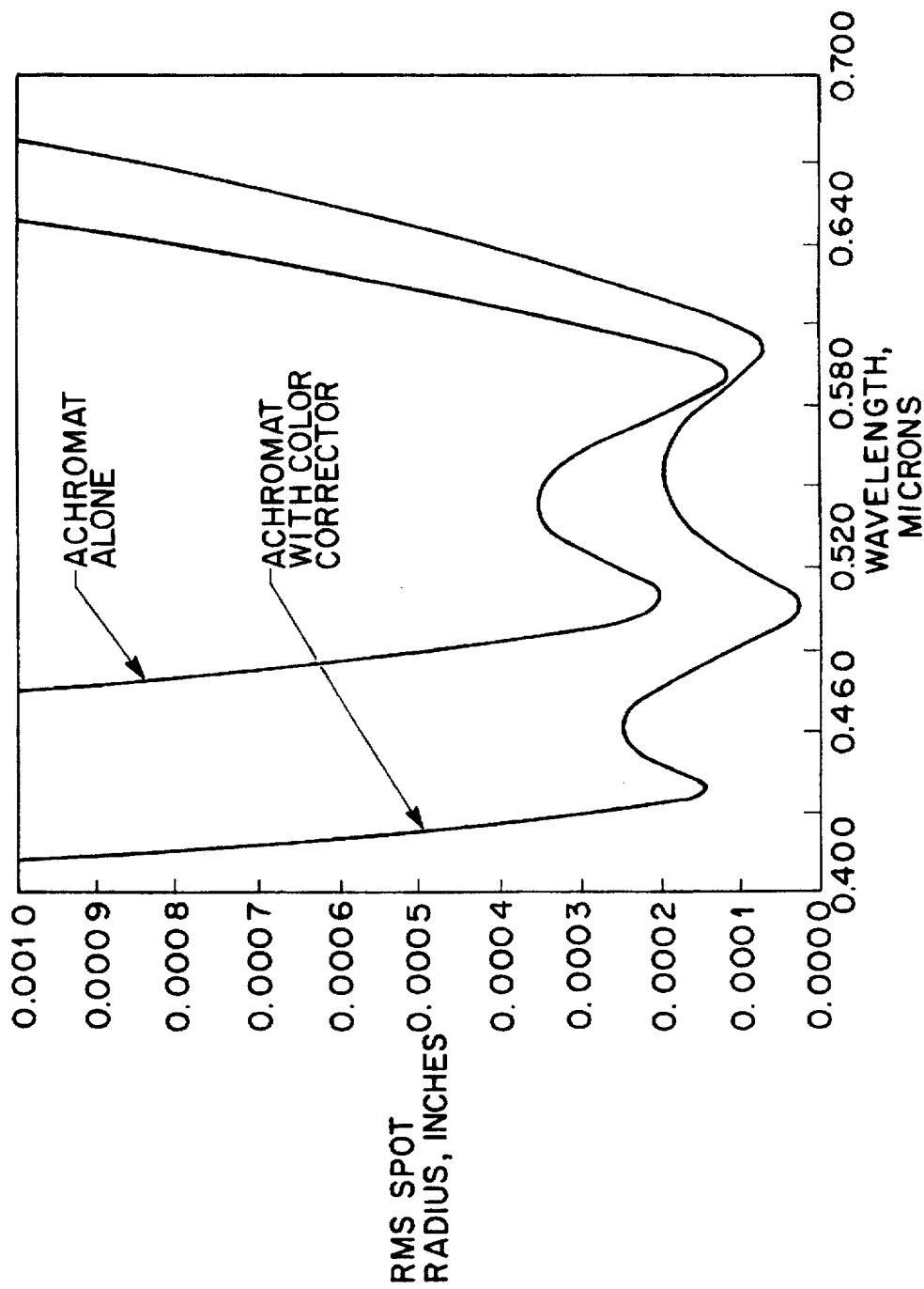
FIG_5

AUXILIARY LENS WITH LIQUID ELEMENT FOR CORRECTING SECONDARY COLOR

This is a continuation of U.S. patent application Ser. No. 08/342,128 filed on Nov. 18, 1994 now abandoned.

TECHNICAL FIELD

This invention relates to color corrected optical systems, and more particularly, to methods of reducing residual secondary color errors of nominally achromatic optical systems.

BACKGROUND OF THE INVENTION

An achromatic lens system is, by definition, one which has paraxial chromatic correction at two discrete wavelengths. The residual color error at wavelengths other than these two is often called secondary color. Apochromatic lens systems have much smaller secondary color because they are corrected at three wavelengths. The residual color error of an apochromat is often referred to as tertiary color.

All apochromatic lens systems require the use of one or more abnormal dispersion lens materials. Typically these abnormal dispersion materials are special glasses or crystals. An exception to this approach is to use abnormal dispersion liquids such as that described by this patentee in U.S. Pat. Nos. 4,958,919; 5,033,831; and 5,345,337. These patents describe the use of liquid lens "elements" located near the entrance pupil to achieve apochromatic color correction. Because of cost reasons, many optical systems are designed from the beginning to have only achromatic color correction. In fact, probably more than 95% of all color corrected optical systems have only achromatic color correction. Consequently, it is desirable to provide a simple color corrector that could be added onto an existing lens system to convert the achromatic color correction into apochromatic color correction.

Sub-aperture secondary color correctors are known which use optical glasses exclusively. A typical application is used for correcting the secondary color of an achromatic telescope objective. See, for example, Roland W. Christen, "A New Approach to Color Correction," Sky and Telescope, Volume 70, page 375 et. seq., October 1985 and Robert D. Sigler, "Glass selection for airspaced apochromats using the Buchdahl dispersion equation," Applied Optics, Volume 25, no. 23, page 1 et. seq., December 1986.

Unfortunately, all-glass sub-aperture color corrector designs are costly and have abnormal dispersion glasses with undesirable mechanical characteristics in the abnormal dispersion case. Further, the lens element powers required in an all-glass design are typically quite large, with the result that off-axis optical performance of the total system is usually compromised and the monochromatic aberration balance of the nominal lens system may be lost.

SUMMARY OF THE INVENTION

According to the present invention, the residual secondary color error of an achromatic optical system—conveniently referred to here as "the achromat"—is reduced by inserting a glass-liquid secondary color corrector lens in the light path between the achromat and its image plane. By designing the glass-liquid color corrector to be inserted in the convergent light path of the achromat, the relative dimensions of the corrector lens are reduced compared to those elements located close to the entrance pupil. According to one embodiment of the present invention, the corrector is coupled to the achromat without significantly changing its focal length or monochromatic aberration balance. Further, according to one embodiment of the present invention, an add-on secondary color corrector lens is used, which is significantly smaller in diameter than the entrance pupil of the corrected lens system.

Accordingly, a sub-aperture color corrector design according to the present invention is fabricated from normal dispersion glasses and abnormal dispersion liquids, offering a low-cost, high performance alternative to existing all-glass or glass-crystal designs.

BRIEF DESCRIPTION OF THE DRAWINGS

FIG. 1 is a side layout of a glass-liquid color corrector according to the present invention, which is inserted in the convergent light path of an achromatic telescope objective;

FIG. 2 is a detail layout of the glass-liquid corrector of FIG. 1 in which the first and third lenses of the glass-liquid color corrector of the present invention are made of normal dispersion glasses and an abnormal dispersion liquid lens is used as the second lens;

FIG. 3 is an expanded view of a selected portion of FIG. 2 in which the interface of first and second normal dispersion lens with a liquid lens therebetween having abnormal dispersion characteristics is shown;

FIG. 4 is a graph of the change in focal length versus wavelength for an achromatic objective taken first alone and then for the achromatic objective plus a glass-liquid color corrector according to the present invention; and FIG. 5 is a graph of the on-axis root mean square (RMS) spot radius versus wavelength for the achromatic objective alone and also for the achromatic objective plus the glass-liquid color corrector according to the present invention.

DETAILED DESCRIPTION OF THE PREFERRED EMBODIMENTS

FIG. 1 shows a secondary color corrector system 12 including first and second normal dispersion glass lenses 13 and 14, and a liquid lens 15 therebetween having abnormal dispersion characteristics which reduce the secondary color aberration effects of an achromatic objective 19, according to the present invention. Secondary color corrector system 12 is positioned on the optic axis 21 of achromatic objective 19. According to an embodiment of the present invention, secondary color corrector system 12 is positioned on optic axis 21 at approximately two thirds of the distance between achromatic objective 19 and an image plane 23 at the focal point of achromatic objective 19 and secondary color corrector 12. The combined focal length of achromatic objective 19 and secondary color corrector 12 is approximately 60", and both have a focal ratio of approximately f/10. Secondary color corrector system 12 includes containment structure 49. Achromatic objective 19 is mounted in containment structure 49 which transmits light along optic axis 21. According to one embodiment of the present invention, containment structure 49 is tubular.

FIG. 2 shows secondary color corrector system 12 according to the present invention with normal dispersion glass lenses 13 and 14 and liquid lens 15 having abnormal dispersion characteristics. In particular, glass lens 13 has generally spherical opposite surfaces 31 and 32, and according to an embodiment of the present invention, is made of SCHOTT SF6 glass material. Glass lens 14 has approximately spherical opposite surfaces 41 and 42, and, according to an embodiment of the present invention, is made of SCHOTT LAF2 glass material. Lenses 13, 14, and 15 are mounted coaxially with the achromatic objective 19 and image plane 23, as shown in FIG. 1.

Containment structure 49 and glass lenses 13 and 14 of secondary color corrector 12 contain abnormal dispersion liquid lens 15. According to one embodiment of the present invention, the abnormal dispersion liquid of lens 15 comprises one or more selected liquids from Cargille Laboratories "Series EC31" abnormal dispersion liquids. This series of liquids is bounded by liquids 642134 and 550206. Lenses 13 and 14 are mounted in containment structure 49 with a flexible adhesive 50 such as fluorosilicone. This permits liquid lens 15 to expand and contract with changes in the ambient temperature. FIG. 3 shows the interfaces between first and second rigid lens 13 and 14 having normal dispersion characteristics and abnormal dispersion liquid lens 15.

FIG. 4 shows the change in focal length versus wavelength for both the achromat objective 19 alone and with a secondary color corrector system 12 according to the present invention. The combined achromat 19 and color corrector 12 have a curve which crosses the line for zero focal length error three times. The three zero crossings of the achromat plus the color corrector qualifies the combination as an apochromat and produces substantially zero focal length change over a wide wavelength band, e.g., from 0.43 micron to 0.61 micron.

FIG. 5 shows the on-axis root mean square spot radius versus wavelength for a wavelength range from 0.4–0.7 micron, for both achromatic objective 19 alone and for the combined achromat 12 and color corrector 12 according to the present invention. The reduction in spot size afforded by the addition of color corrector 12 is indicated over a wide wavelength range, e.g., from 0.43 micron to 0.62 micron.

A 6 inch diameter, f/10, achromatic telescope objective with a secondary color corrector according to one embodiment of the present invention may have an optical prescription specified as follows:

TABLE 1

| Surface No. | Radius (inches) | Thickness (inches) | $N_d$ | $V_d$ | Material |
|---|---|---|---|---|---|
| 1 | 29.658 | 0.700 | 1.516800 | 64.16 | SCHOTT material BK7 |
| 2 | −25.090 | 0.00200 | | | AIR |
| 3 | −25.090 | 0.400 | 1.620041 | 36.36 | SCHOTT material F2 |
| 4 | −184.555 | 40.000 | | | AIR |
| 5 | −21.739 | 0.200000 | 1.805182 | 25.43 | SCHOTT material SF6 |
| 6 | 31.031 | 0.0485 | 1.642690 | 13.49 | 642134 |
| 7 | 3981.610 | 0.250 | 1.744002 | 44.71 | SCHOTT material LAF2 |
| 8 | −17.486 | 19.187 | | | AIR | where the surfaces of the respective lens elements are numbered consecutively from left to right along the optic axis in accordance with standard optical design convention. The radii and thicknesses listed for each lens surface in Table 1 are in inches. In accordance with convention, the radius of curvature is positive if the center of curvature of the surface lies to the right of the surface, and negative if the center of curvature of the surface lies to the left of the surface. The two glass lenses of the color corrector (with diameters of 2.6 inches) are less than half the size of the achromatic objective lenses. The column headed $N_d$ in Table 1 refers to the index of refraction of the applicable lens at the wavelength of the sodium d spectral line (i.e., 0.58756 micron). The column headed $V_d$ refers to the Abbe number for the lens.

The indices of refraction for the lens materials employed according to one embodiment of the present invention, are tabulated as follows for five representative wavelengths:

TABLE 2

| Material | $N_1$ 0.58756 μm | $N_2$ 0.48613 μm | $N_3$ 0.65627 μm | $N_4$ 0.43584 μm | $N_5$ 0.70652 μm |
|---|---|---|---|---|---|
| SCHOTT material BK7 | 1.5116800 | 1.522377 | 1.514323 | 1.526685 | 1.512892 |
| SCHOTT material F2 | 1.620041 | 1.632083 | 1.615033 | 1.642015 | 1.612268 |
| SCHOTT material SF6 | 1.805182 | 1.827753 | 1.796092 | 1.847070 | 1.791166 |
| LIQUID 642134 | 1.642690 | 1.678028 | 1.630387 | 1.716612 | 1.624096 |
| SCHOTT material LAF2 | 1.744002 | 1.755685 | 1.739048 | 1.765098 | 1.736283 |

The lens system of the above embodiment has been evaluated for optical performance over the visible spectrum. In particular, a graphical indication of the performance of the above lens system is provided by graphs of focal length and the RMS spot radius as a function of wavelength shown in FIGS. 4 and 5 respectively. The curves in these figures indicate that the chromatic correction of the achromatic telescope objective is considerably improved by the addition of the sub-aperture, glass-liquid, secondary color corrector. In fact, the lens system with the addition of color corrector 12 is an apochromat.

The present invention has been described above in terms of certain exemplary embodiments. However, practitioners skilled in the art of optical design, after having perused the foregoing description and the accompanying drawing, could readily develop design forms for other embodiments without departing from the scope of the present invention. Therefore, the present invention is defined more generally by the following claims and their equivalents.

What is claimed is:

1. An auxiliary optical package for secondary color correction of a selected achromatic optical system, said package being spaced apart from the achromatic optical system and comprising:

a first lens having a first lens axis and comprising a selected rigid optical material having substantially normal dispersion;

a second lens mounted coaxially with said first lens and comprising a selected rigid optical material having substantially normal dispersion; and a substantially abnormal dispersion liquid contained between said first and second lenses and located along a common optical axis, the optical prescription of said first lens, said second lens, and said substantially abnormal dispersion liquid being selected to produce a substantially zero focal length change in the achromatic optical system over a wavelength band of approximately 0.43 micron to 0.61 micron; wherein a containment structure mechanically and coaxially couples said system and said package in spaced-apart relationship; whereby said auxiliary optical package performs just one function: secondary color correcting said achromatic optical system, and does not change any other optical characteristics of said achromatic optical system.

2. The package according to claim 1 wherein the substantially abnormal dispersion liquid includes at least a single liquid from the group of abnormal dispersion liquids offered by Cargille Laboratories under the name Series EC31.

3. An auxiliary optical package for secondary color correction of a selected achromatic optical system, said package being spaced apart from the achromatic optical system and comprising:

- a first lens having a first lens axis and comprising a selected rigid optical material having substantially normal dispersion;
- a second lens mounted coaxially with said first lens and comprising a selected rigid optical material having substantially normal dispersion; and
- a substantially abnormal dispersion liquid contained between said first and second lenses and located along a common optical axis, the optical prescription of said first lens, said second lens, and said substantially abnormal dispersion liquid being selected to produce a substantially zero focal length change in the achromatic optical system over a wavelength band of approximately 0.43 micron to 0.61 micron, said package being built according to the following design form:

| Surface No. | Radius (inches) | Thickness (inches) | $N_d$ | $V_d$ | Material |
|---|---|---|---|---|---|
| 5 | −21.793 | 0.200 | 1.805182 | 25.43 | SCHOTT SF6 |
| 6 | 31.031 | 0.0485 | 1.642690 | 13.49 | CARGILLE 642134 |
| 7 | 3981.610 | 0.250 | 1.744002 | 44.71 | SCHOTT LAF2 |
| 8 | −17.487 | | | | AIR | where surfaces 5 through 8 are surfaces of the package counting consecutively from an object side to an image side;

$N_d$ is the index of refraction, at the wavelength of the sodium d spectral line, of the lens situated between the surface corresponding to said $N_d$ and the next higher-numbered surface; and $V_d$ is the Abbe number of the lens situated between the surface corresponding to said $V_d$ and the next higher-numbered surface; wherein said auxiliary optical package performs secondary color correction of said achromatic optical system.

4. An auxiliary self-contained optical package for secondary color correcting an achromatic objective lens system, said package being spaced-apart from said achromatic objective lens system and comprising first and second normal dispersion lenses, with a mixture of at least two substantially abnormal dispersion liquids situated between said first and second normal dispersion lenses, whereby:

said package produces a substantially zero focal length change in the achromatic objective lens system over a wavelength band of approximately 0.43 micron to 0.61 micron; and said auxiliary self-contained optical package performs just one function: secondary color correcting said achromatic objective lens system, and does not change any other optical characteristics of said achromatic optical system.

* * * * *